United States Patent
Heiskanen et al.

(10) Patent No.: US 11,920,297 B2
(45) Date of Patent: Mar. 5, 2024

(54) METHOD FOR TREATING A FIBROUS MATERIAL COMPRISING NANOCELLULOSE WITH AN ORGANIC ACID OR ORGANIC ACID SALT

(71) Applicant: Stora Enso OYJ, Helsinki (FI)

(72) Inventors: Isto Heiskanen, Imatra (FI); Katja Lyytikäinen, Imatra (FI); Otto Nylén, Helsinki (FI); Kaj Backfolk, Lappeenranta (FI)

(73) Assignee: Stora Enso OYJ, Helsinki (FI)

( * ) Notice: Subject to any disclaimer, the term of this patent is extended or adjusted under 35 U.S.C. 154(b) by 249 days.

(21) Appl. No.: 17/415,878

(22) PCT Filed: Dec. 20, 2019

(86) PCT No.: PCT/IB2019/061181
§ 371 (c)(1),
(2) Date: Jun. 18, 2021

(87) PCT Pub. No.: WO2020/128996
PCT Pub. Date: Jun. 25, 2020

(65) Prior Publication Data
US 2022/0074140 A1   Mar. 10, 2022

(30) Foreign Application Priority Data

Dec. 21, 2018   (SE) .................... 1851644-3

(51) Int. Cl.
*D21H 11/18* (2006.01)
*D21C 9/00* (2006.01)
*D21H 17/28* (2006.01)

(52) U.S. Cl.
CPC ............. *D21C 9/005* (2013.01); *D21H 11/18* (2013.01); *D21H 17/28* (2013.01)

(58) Field of Classification Search
CPC ......... D21C 9/005; D21H 11/18; D21H 17/28
USPC ...................................... 162/146
See application file for complete search history.

(56) References Cited

U.S. PATENT DOCUMENTS

| 5,183,707 A | 2/1993 | Herron et al. |
| 6,184,271 B1 | 2/2001 | Westland et al. |
| 2002/0031971 A1 | 3/2002 | Westland et al. |
| 2011/0262731 A1 | 10/2011 | Mukai et al. |
| 2012/0009661 A1 | 1/2012 | Miyawaki et al. |
| 2013/0345415 A1 | 12/2013 | Trigiante |
| 2018/0065092 A1 | 3/2018 | Mihranyan |
| 2018/0142411 A1 | 5/2018 | Bilodeau et al. |
| 2018/0230279 A1 | 8/2018 | Banzashi et al. |

FOREIGN PATENT DOCUMENTS

| CN | 105542218 A | 5/2016 |
| EP | 2371892 A1 | 12/2009 |
| JP | 2010167411 A | 8/2010 |
| JP | 2015533858 A | 11/2015 |
| JP | 2017031548 A | 2/2017 |
| JP | 2017078145 A | 4/2017 |
| WO | 2012170682 A1 | 12/2012 |
| WO | 2013180643 A1 | 12/2013 |
| WO | 2014181560 A1 | 11/2014 |
| WO | 2016072230 A1 | 5/2016 |
| WO | 2016072231 A1 | 5/2016 |
| WO | 2016183453 A1 | 11/2016 |
| WO | 2017046755 A1 | 3/2017 |
| WO | 2017105337 A1 | 6/2017 |
| WO | 2017113275 A1 | 6/2017 |
| WO | 2017199252 A1 | 11/2017 |
| WO | 2018002815 A1 | 1/2018 |
| WO | 2018060868 A1 | 4/2018 |
| WO | 2018211441 A1 | 11/2018 |

OTHER PUBLICATIONS

Extended European Search Report from corresponding European application No. 19900806.1, dated Jul. 22, 2022.
Herrera, Martha A. et al. Barrier and mechanical properties of plasticized and cross-linked nanocellulose coatings for paper packaging applications, Cellulose 2017, 24:3969-3980.
International Search Report from corresponding PCT Application No. PCT/IB2019/061181 dated Mar. 10, 2020.
Wang, J. et al. Moisture and Oxygen Barrier Properties of Cellulose Nanomaterial-Based Films, ACS Sustainable Chem. Eng., 2018, 6 (1), pp. 49-70.
Kontturi, K. et al., Specific water uptake of thin films from nanofribrillar cellulose, Journal of Materials Chemistry A, 2013, 1, 13655.

*Primary Examiner* — Mark Halpern
(74) *Attorney, Agent, or Firm* — Greer, Burns & Crain, Ltd.

(57) ABSTRACT

The present invention relates to a method for preparing a surface-treated fibrous material comprising nanocellulose, in which a fibrous material is surface treated with an organic acid or salt thereof. Fibrous materials as such are also provided. The present technology allows improved Water Vapor Transmission Rates (WVTR) for the fibrous material, while operating on an industrial scale.

19 Claims, 3 Drawing Sheets

METHOD FOR TREATING A FIBROUS MATERIAL COMPRISING NANOCELLULOSE WITH AN ORGANIC ACID OR ORGANIC ACID SALT

This application is a U.S. National Phase under 35 U.S.C. § 371 of International Application No. PCT/IB2019/061181, filed Dec. 20, 2019, which claims priority under 35 U.S.C. §§ 119 and 365 to Swedish Application No. 1851644-3, filed Dec. 21, 2018.

The present technology relates to a method for preparing a surface-treated fibrous material comprising nanocellulose, in which a fibrous material is surface treated with an organic acid or organic acid salt. Fibrous materials as such are also provided. The present technology allows improved Water Vapor Transmission Rates (WVTR) for the fibrous material, while operating on an industrial scale.

BACKGROUND

The problem of moisture sensitivity of nanocellulose films is described in many scientific articles including a number of theories and possible effects of the water vapor—induced swelling such as a good oxygen barrier, see review e.g. by Wang, J., et al., (Moisture and Oxygen Barrier Properties of Cellulose Nanomaterial-Based Films, ACS Sustainable Chem. Eng., 2018, 6 (1), pp 49-70). In addition to the role of cellulose crystallinity, polymer additives (Kontturi, K., Kontturi, E., Laine, J., Specific water uptake of thin films from nanofribrillar cellulose, Journal of Materials Chemistry A, 2013, 1, 13655) and a number of various hydrophobic coating solutions have been suggested.

In short, both Microfibrillated cellulose (MFC) properties (crystallinity, charge, particle size) as well as the characteristics of the formed network (swelling, cross-linking etc.) of the neat film influences the barrier properties.

A number of cross-linking agents have been proposed in the patent and scientific literature. The problem with many of these above solutions, are that they are not industrially scalable neither suitable for high speed nor large scale manufacturing concepts. Mixing and modification of nanocellulose is technically difficult and may lead to problem with corrosion, unbalanced wet end charge, depositions in the wet-end, insufficient material and fiber retention. The use of crosslinking agents in the furnish might also lead to uncontrolled level and heterogenous cross-linking and gel forming, which will influence dewatering rate and subsequent film and barrier quality.

A problem remains to make how to make treatment of fibrous materials more efficient and to provide enhanced barrier properties, especially at high relative humidities.

SUMMARY

Encouraging results have been found by the present inventors for nanocellulose fibrous material treated with a solution comprising an organic acid or organic acid salt.

A method is provided for preparing a surface-treated fibrous material comprising nanocellulose, said method comprising the steps of:
a. forming a fibrous material from a suspension comprising nanocellulose,
b. surface treatment of the fibrous material with a solution comprising an organic acid or organic acid salt to obtain a surface-treated fibrous material having a surface pH of at least 3 wherein the barrier properties of the fibrous material is improved.

A fibrous material, in particular a fibrous film material, is also provided. Additional features of the method and materials are provided in the following text and the patent claims.

DETAILED DISCLOSURE

Specific Embodiments of the Invention

As set out above, a method is provided for preparing a surface-treated fibrous material comprising nanocellulose. The method comprises the steps of:
a. forming a fibrous material from a suspension comprising nanocellulose,
b. surface treatment of the fibrous material with a solution comprising an organic acid or organic acid salt to obtain a surface-treated fibrous material having a surface pH of at least 3 wherein the barrier properties of the fibrous material is improved.

The pH of the surface of the fibrous material is measured on the final product, i.e. the dry product. "Surface pH" is measured by using fresh pure water which is placed on the surface. Five parallel measurements are performed and the average pH value is calculated. The sensor is flushed with pure or ultra-pure water and the paper sample is then placed on the moist/wet sensor surface and pH is recorded after 30 s. Standard pH meters are used for the measurement. The "surface pH" should be above 3, preferably above 4, preferably between 4-9, even more preferred between 4-8.

Fibrous Material

The fibrous material used in this method is formed from a suspension comprising nanocellulose. In one embodiment, the nanocellulose is a non-derivatized or chemically modified nanocellulose such as native nanocellulose or phosphorylated nanocellulose. The hemicellulose content should preferably be less than 25 wt %, more preferably less than 20 wt % most preferably less than 15%.

The nanocellulose suspension can contain one or several grades of nanocellulose and fibers such as native nanocellulose and phosphorylated nanocellulose or even a mixture of nanocellulose and other cellulose fibers, such as kraft fibers.

Nanocellulose (also called Microfibrillated cellulose (MFC) or cellulose microfibrils (CMF)) shall in the context of the present application mean a nano-scale cellulose particle fiber or fibril with at least one dimension less than 100 nm. Nanocellulose comprises partly or totally fibrillated cellulose or lignocellulose fibers. The cellulose fiber is preferably fibrillated to such an extent that the final specific surface area of the formed nanocellulose is from about 1 to about 300 m$^2$/g, such as from 1 to 200 m$^2$/g or more preferably 50-200 m$^2$/g when determined for a solvent exchanged and freeze-dried material with the BET method.

Various methods exist to make nanocellulose, such as single or multiple pass refining, pre-hydrolysis followed by refining or high shear disintegration or liberation of fibrils. One or several pre-treatment steps are usually required in order to make nanocellulose manufacturing both energy-efficient and sustainable. The cellulose fibers of the pulp to be supplied may thus be pre-treated enzymatically or chemically, for example to reduce the quantity of hemicellulose or lignin. The cellulose fibers may be chemically modified before fibrillation, wherein the cellulose molecules contain functional groups other (or more) than found in the original cellulose. Such groups include, among others, carboxymethyl, aldehyde and/or carboxyl groups (cellulose obtained by N-oxyl mediated oxidation, for example "TEMPO"), or quaternary ammonium (cationic cellulose). After being modified or oxidized in one of the above-described methods, it is easier to disintegrate the fibers into nanocellulose.

The nanofibrillar cellulose may contain some hemicelluloses; the amount is dependent on the plant source. Mechanical disintegration of the pre-treated fibers, e.g. hydrolysed, pre-swelled, or oxidized cellulose raw material is carried out with suitable equipment such as a refiner, grinder, homogenizer, colloider, friction grinder, ultrasound sonicator, single—or twin-screw extruder, fluidizer such as microfluidizer, macrofluidizer or fluidizer-type homogenizer. Depending on the MFC manufacturing method, the product might also contain fines, or nanocrystalline cellulose or e.g. other chemicals present in wood fibers or in papermaking process. The product might also contain various amounts of micron size fiber particles that have not been efficiently fibrillated.

Nanocellulose can be produced from wood cellulose fibers, both from hardwood or softwood fibers. It can also be made from microbial sources, agricultural fibers such as wheat straw pulp, bamboo, bagasse, or other non-wood fiber sources. It is preferably made from pulp including pulp from virgin fiber, e.g. mechanical, chemical and/or thermomechanical pulps. It can also be made from broke or recycled paper.

Phosphorylated nanocellulose (also called phosphorylated microfibrillated cellulose; p-MFC) is typically obtained by reacting cellulose pulp fibers with a phosphorylating agent such as phosphoric acid in presence of urea and water, and subsequently fibrillating the fibers to p-MFC. One particular method involves providing a suspension of cellulose pulp fibers in water and phosphorylating the cellulose pulp fibers in said water suspension with a phosphorylating agent, followed by fibrillation with methods common in the art. Suitable phosphorylating agents include phosphoric acid, phosphorus pentaoxide, phosphorus oxychloride, diammonium hydrogen phosphate and sodium dihydrogen phosphate.

In the reaction to form p-MFC, alcohol functionalities (—OH) in the cellulose are converted to phosphate groups (—$OPO_3^{2-}$). In this manner, crosslinkable functional groups (phosphate groups) are introduced to the pulp fibers or microfibrillated cellulose. Typically, the p-MFC is in the form of its sodium salt.

A suspension of native nanocellulose may be used to form the fibrous material, preferably with a hemicellulose content less than 25 wt %, more preferably less than 20 wt % most preferably less than 15%.

The suspension used to form the fibrous material is typically an aqueous suspension. The suspension may comprise additional chemical components known from papermaking.

The nanocellulose suspension may additionally comprise cationic or anionic nanocellulose; such as carboxymethylated or phosphorylated nanocellulose.

Suitably, the fibrous material contains at least 0.5 wt % oxidized nanocellulose, preferably more than 5 wt % oxidized nanocellulose, most preferably more than 10 wt % oxidized nanocellulose. The oxidized nanocellulose may have a crystallinity higher than 50%, preferably higher than 60, more preferably higher than 70%.

The forming process of the fibrous material from the suspension may be casting or wet-laying or coating on a substrate from which the fibrous material is not removed. The fibrous material formed in the present methods should be understood as having two opposing primary surfaces. Accordingly, the fibrous material may be a film or a coating, and is most preferably a film. The fibrous material has a grammage of between 1-80, preferably between 10-50 gsm, such as e.g. 10-40 gsm. For coatings in particular, the grammage can be low, e.g. 1-10 gsm (or even 0.1-10 gsm).

In one aspect of the methods described herein, the fibrous material is surface-treated after it has been dried, e.g. while it has a solid content of 40-99% by weight, such as e.g. 60-99% by weight, 80-99% by weight or 90-99% by weight.

In another aspect of the methods described herein, the fibrous material is surface-treated before it has been substantially dewatered and dried, e.g. while it has a solid content of 0.1-80% by weight, such as e.g. 0.5-75% by weight or 1.0-50% by weight.

In another aspect of the methods described herein, the fibrous material to be surface-treated is a free standing film having a grammage in the range of 1-100 $g/m^2$, more preferred in the range of 10-50 $g/m^2$. This free-standing film may be directly attached onto a carrier substrate or attached via one or more tie layers.

The fibrous material is suitably formed from a suspension comprising phosphorylated nanocellulose. Typically, the fibrous material comprises phosphorylated nanocellulose in an amount of between 0.01-100 wt %, such as between 0.1 and 50 wt %, suitably between 0.1 and 25 wt %, such as between 0.1 and 10 wt %, or between 0.1 and 5 wt %. The phosphorylated nanocellulose preferably has a high degree of substitution; i.e. in the range of 0.1-4.0, preferably 0.5-3.8, more preferably 0.6-3.0, or most preferably 0.7 to 2.0 mmol/g of phosphate groups as e.g. measured by titration method or by using elemental analysis described in the prior art.

The fibrous material may include other fibrous materials. For instance, the fibrous material may comprise native nanocellulose in an amount of 1-99.5 wt-%. In another aspect, the native nanocellulose contains lignin. In a further aspect, the fibrous material comprises a mixture of native nanocellulose and modified nanocellulose, preferably p-MFC. In yet another aspect the fibrous material may comprise modified nanocellulose in an amount of 1-99.5 wt-%, the modified nanocellulose if preferably carboxymethylated nanocellulose or phosphorylated nanocellulose (also referred to as p-MFC).

The fibrous material may also comprise normal pulp fibers in an amount of 1-80% by weight based on the total amount of fibers and nanofibers. The pulp can be e.g. kraft pulp, sulphite, unbleached pulp, CTMP, TMP, dissolving pulp, organosolv pulp, recycled pulp, sulfite pulp, non-wood pulp, NSSK, NBSK, SBSK, deinked pulp etc.

The fibrous material may comprise lignin. The lignin can be in the form of a chemical product, or as lignin-containing fibres. Lignin can be added to the fibrous material before or during the forming process. Lignin can also be added during or in combination with the surface treatment step. It has been found that good results can be achieved if the fibrous material is treated with lignin, simultaneously with organic acid treatment. The advantage of this is that a fibrous material can be obtained with good OTR at high RH but also with other features provided by the lignin (antibacterial, UV barrier, etc). Also, the fibrous material may comprise lignin and nanocellulose. The proportion of lignin in this aspect can be 0.1-99% based on the amount of nanocellulose.

The fibrous material suitably comprises 0.1 wt % starch, preferably more than 1 wt % starch, most preferably more than 2 wt % starch. The starch can be cationic, anionic, non-ionic, amphoteric, or chemically modified or grafted. It can be in cooked, gelled or e.g. in particle form. One preferred starch is e.g. dialdehyde starch It has been shown that addition of starch can facilitate the barrier properties.

The suspension used to form the fibrous material is typically an aqueous suspension. The suspension may comprise additional chemical components known from papermaking processes. Examples of these may be nanofillers or fillers such as nanoclays, bentonite, talc, calcium carbonate, kaolin, $SiO_2$, $Al_2O_3$, $TiO_2$, gypsum, etc. The fibrous substrate may also contain strengthening agents such as native starch, cationic starch, anionic starch or amphoteric starch. The suspension might also contain synthetic polymers as strengthening agents. In a further embodiment, the fibrous substrate may also contain retention and drainage chemicals such as cationic polyacrylamide, anionic polyacrylamide, silica, nanoclays, alum, PDADMAC, PEI, PVam, etc. In yet a further embodiment, the fibrous material may also contain other typical process or performance chemicals such as dyes or fluorescent whitening agents, defoamers, wet strength resins, biocides, hydrophobic agents, barrier chemicals, cross-linking agents, etc.

The fibrous material may also comprise one or more fillers, such as a nanofiller, in the range of 1-50% by weight. Typical nanofillers can be nanoclays, bentonite, silica or silicates, calcium carbonate, talcum, etc. Preferably, at least one part of the filler is a platy filler. Preferably, one dimension of the filler should have an average thickness or length of 1 nm to 10 µm.

Before surface treatment, the fibrous material suitably has a Water Vapor Transmission Rate (WVTR) value higher than 50 or more preferably higher than 80 and most preferably higher than 100 cc/m²/24 h (23° C., 50% RH) according to ASTM F-1249 at a grammage between 10-50 gsm, more preferably in the range of 50-1000 cc/m²/24 h. In some cases, the WVTR values obtained are not even measurable with standard methods.

Forming of the fibrous material before the surface treatment step may comprise the following steps:
a. providing a nanocellulose suspension comprising nanofibers;
b. providing said suspension to a wire or a carrier substrate
c. dewatering of said suspension; and
d. drying of said nanocellulose suspension to obtain a fibrous material.

The fibrous material is preferably in the form of a film. The film may either be made with cast forming or cast coating technique, i.e. deposition of a nanocellulose suspension on a carrier substrate such as metal or plastic belt or by using a wet laid technique such as a wire in a papermaking process or modified version thereof. Another way to make a base film is to use a carrier surface such as plastic, composite, or paper or paperboard substrate, onto which the film is directly formed and not removed.

The manufacturing pH during the film making should preferably be higher than 3, more preferably higher than 5.5, but preferably less than 12 or more preferably less than 11, since it is believed that this probably influences the initial OTR values of the film.

Solution of Organic Acid

The method requires a solution of an organic acid or organic acid salt. The solvent for the organic acid component is predominantly water (e.g. over 50% v/v water) or even pure water, although other co-solvents and additives can be added. For instance, the organic acid solution may further comprise polysaccharides such as CMC, starch, guar gum, MFC or anionic, cationic or amphoteric polysaccharide, or mixtures thereof. The organic acid might also contain its derivatives or the sodium salts of the derivatives such as citric acids derivative such as monosodium citrate, disodium citrate or trisodium citrate.

By the term "organic acid" is meant an organic molecule having at least one carboxylic acid ($-CO_2H$) group(s). In one aspect, the organic acid may comprise two or more, or even three or more carboxylic acid ($-CO_2H$) groups. Specific organic acids are selected from the group consisting of citric acid, lactic acid, acetic acid, formic acid, oxalic acid, uric acid, glycolic acid, Succinic acid, Glutaric acid, Adipic acid, etc and salts thereof. Mixtures of more than one organic acid are possible. The preferred organic acid is citric acid.

The solution may further comprise one or several acids, one or several bases, water soluble polymers, lignin, cellulose derivatives such as CMC, HEC, EHEC, HPC, HME-HEC, etc., starch, guar gum, protein, chitin, MFC or anionic, cationic or amphoteric polysaccharide, or mixtures thereof.

It may be preferred that the solution is buffered, i.e. that is comprises a mixture of organic acid and an alkali, preferably sodium hydroxide. The buffered solution is prepared by adding the alkali into the organic acid solution until the solution has the desired pH. The amount of alkali used depends on the strength of the organic acid used as well as the desired pH of the solution. It has been found that by using a solution with a pH between 3-6, preferably between 4-5, an improved cross-linking of the fibrous material can be achieved. Consequently, by controlling the pH of the solution and thus also the pH of the surface treatment a fibrous material with improved barrier properties can be produced.

The treatment solution may also comprise at least one of the following additives, silica, silicates, nanoclay, lignin, starch, MFC, or cellulose derivatives.

The treatment solution might further comprise rheology modifiers, surface active agents (to control wetting) or other forms of crosslinkers such as glutaraldehyde or glyoxals.

Surface Treatment

The method disclosed herein require surface treatment of the fibrous material with a solution comprising an organic acid or organic acid salt, to obtain a surface-treated fibrous material. Surface treatment may take place on only one surface of the fibrous material, but may also advantageously take place on both surfaces. The treatment might also be a so-called multi-layering process, which takes place in one or several steps. The surface treatment with the solution will create cross-linking of the material which will improve the barrier properties of the fibrous material.

It may be advantageous to only treat one or both surfaces of the fibrous material to such an extent that the organic acid solution does not penetrate into the entire fibrous material in the thickness direction. In this way the amount of organic acid solution can be reduced. Another reason is that it may be preferred to have some un-cross-linked material in the middle of the material to retain strength properties. Such partial penetration of organic acid solution could also be a reason for only treating one surface of the fibrous material.

Generally, the organic acid solution may be applied in an amount between 0.05-50 gsm of the fibrous material, more preferred in an amount of 0.1-10 gsm of the fibrous material.

The surface treatment is performed on a wet or dry fibrous material. The surface treatment step may be followed by drying, preferably a high temperature, of the surface-treated fibrous material. The drying at "high temperature" in this context means between e.g. 40-240° C. or more preferred between 60-200° C. or most preferred between 80-180° C. The temperature is measured as the surface temperature of the web. It has been found that by increasing the drying temperature the barrier properties of the fibrous material are improved.

The surface might also be activated prior the treatment in order to adjust wetting such as with corona or plasma.

Typically, the fibrous material is dewatered and then dried to obtain a solid content of more than 1% by weight, preferably more than 50% by weight.

In one aspect, the fibrous material is post-cured in roll or sheet form, at an average temperature of at least 40° C., more preferably at least 50° C. or most preferably at least 60° C., for at least 1 hour, more preferably 2 hours and most preferably at least 6 hours (average temperature inner, mid and outer layer. It has been found that by post-curing the surface treated fibrous material the barrier properties are improved. This is probably due to improved cross-linking that occurs when the material is treated at an increased temperature and water is removed which will facilitate the cross-linking.

In one aspect, the surface-treated fibrous material has a surface pH above 4, preferably between 4-9, even more preferred between 4-8.

Figure 2:
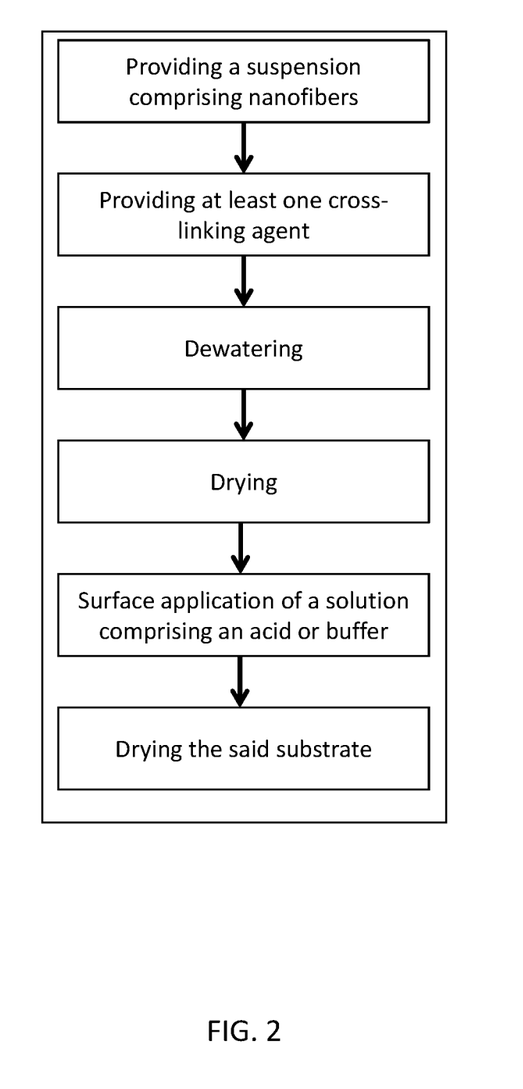
FIG. 2 shows a flowchart of a second embodiment of a method for preparing a surface-treated fibrous material
Figure 3:
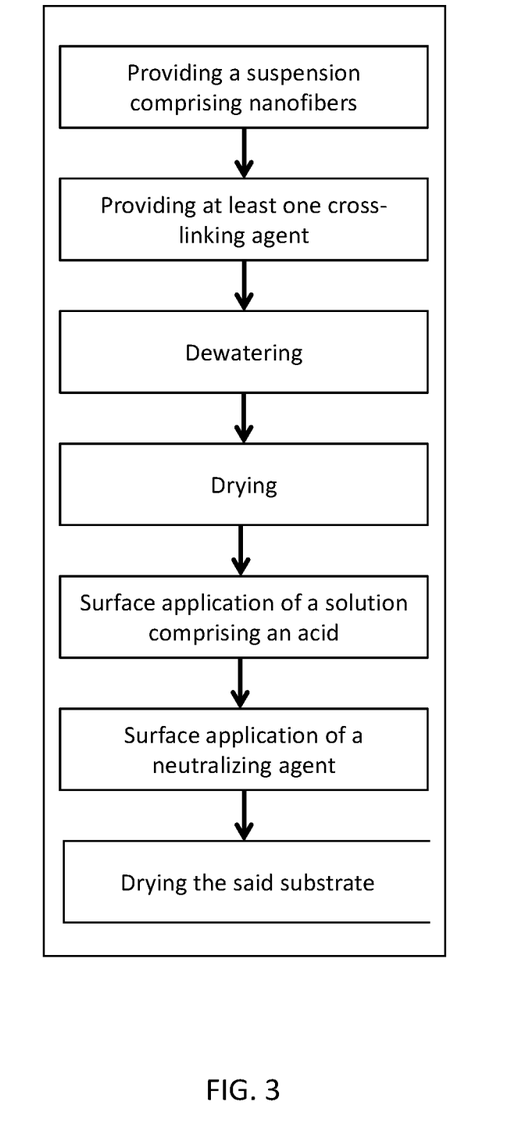
FIG. 3 shows a flowchart of a third embodiment of a method for preparing a surface-treated fibrous material

As shown in FIGS. 2-3, the fibrous material may advantageously be partly crosslinked by treatment with at least one crosslinking agent before or during dewatering. The fibrous material of nanocellulose thus comprises crosslinked nanocellulose. Such a crosslinking agent is suitably selected from the group consisting of glyoxal, glutaraldehyde, metal salts, and cationic polyelectrolyte, dendrimers, or nanopigments.

The surface treatment step may be followed by a neutralizing treatment step with a neutralizing agent before any drying step. The neutralizing step can be done by washing the fibrous material, e.g. with water or treatment with an alkali-based solution, application of a barrier solution to create a thin coating on the material. In this manner, the surface pH can be controlled as desired.

Neutralizing treatment of the fibrous web or the nanocellulose suspension may take place with a neutralizing agent before any drying step, and, optionally, before the surface treatment step. Also, the substrate can contain one or more neutralizing chemicals prior to the surface treatment, such as $CaCO_3$, milk of lime, or then simply base paper pH is increased to more than 7 or preferably more than 8 or most preferably more than 9 before the organic acid treatment).

Typical techniques for surface treatment are those common in the field of papermaking or paper converting. The surface treatment may be performed by immersing, spraying, curtain, size press, film press, blade coating, rotogravure, inkjet, or other non-impact or impact coating methods. In one aspect, the surface treatment is an ion-exchange. The surface treatment may be performed under pressure and/or under ultrasound. In this manner, the degree of penetration of the organic acid solution into the fibrous material can be controlled.

The methods described herein may include one or more additional steps. For instance, they may further comprise the step of rinsing or immersing in rinsing fluid following the surface treatment. Preferably, the methods further comprise the step of drying at elevated temperature and/or pressure following the surface treatment and/or the rinsing step.

Surface treatment according to these methods improves the barrier properties of the fibrous material. It has been found that a densification of the fibrous material occurs when the water is removed from the material. The densification will lead to the organic acid solution coming into closer contact with the nanocellulose and being able to cross-link to the fibrils which will lead to improved barrier properties. Densification will occur if the material comprises some moisture during treatment with the solution or if calendering is done. Consequently, calendaring may be carried out during or after treatment with the solution of organic acid.

Also, the calendaring can be done at higher temperatures to ensure curing and improved cross-linking. Temperatures such as T>120° C. or more preferably >140° C. or most preferably >160° C. but less than 240° C. (cylinder temperature) may be used.

The surface treatment can be performed on-line on a machine i.e. simultaneously as the film is being made or off-line with a separate unit, e.g. a separate coating or printing unit.

Surface-Treated Fibrous Material

The present technology provides a fibrous material obtained via the methods described herein, as well as the fibrous material per se. In one aspect, the fibrous material is a nanocellulose film.

The fibrous material obtained has improved barrier properties. With barrier properties is mean improved resistance for the products to penetrate the barrier, such as gas, oxygen, water, water vapor, fat or grease.

After surface treatment, the fibrous material suitably has a Water Vapor Transmission Rate (WVTR) value in the range of 1-30 $cc/m^2/24$ h (23° C., 50% RH) according to ASTM F-1249 at a grammage between 10-50 gsm. Consequently, by treating a fibrous material according to the invention a material with very good barrier properties, especially water vapor barrier properties are achieved.

A fibrous film material is thus provided having a surface pH above 3; comprising nanocellulose and organic acid, which fibrous material has a Water Vapor Transmission Rate (WVTR) value in the range of 1-30 $cc/m^2/24$ h (23° C., 50% RH) according to ASTM F-1249 and a grammage between 10-50 gsm.

Suitably, the grammage is between 1-100, preferably 10-50 g/m2 if it is a free standing film, and between 1-100 g/m2, most preferably 1-30 g/m2 if it is a directly attached onto a carrier substrate.

The fibrous material can be used as such or laminated with plastic films, paper or paperboards. The fibrous film material should be substantially free of pinholes.

Figure 1:
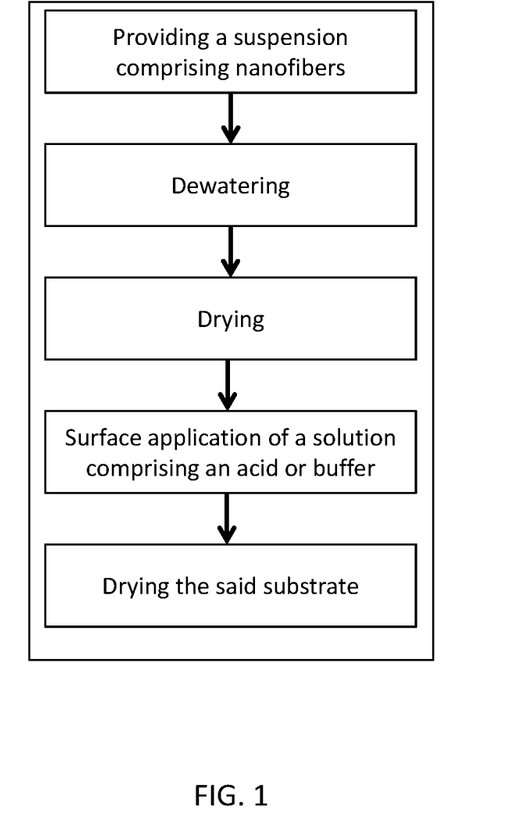
FIG. 1 shows a flowchart of a first embodiment of a method for preparing a surface-treated fibrous material

FIG. 1 shows a flowchart of a method for preparing a surface-treated fibrous material. The first step is to provide a suspension comprising nanofibers. This suspension is dewatered in a second step, and then dried in a third step. A solution of organic acid is applied in a fourth step, and the treated substrate is dried in a fifth and final step.

FIG. 2 shows a flowchart of a method for preparing a surface-treated fibrous material, similar to FIG. 1, but with the additional step of providing a crosslinking agent to the nanofiber suspension prior to the dewatering step.

FIG. 3 shows a flowchart of a method for preparing a surface-treated fibrous material, similar to FIG. 2, but with the additional step of surface application of a neutralizing agent prior to the drying step.

EXPERIMENTAL

Nanocellulose Properties

The properties of the nanocellulose used in the examples below are as followed.

The charge of the nanocellulose used was measured by titration with 0.001 N p-DADMAC (Mw=107000 g/mol) for 0.1 g/l or 0.5 g/l of nanocellulose depending on total cationic demand). Samples used in the experiments are:
  i. Low DS p-MFC (charge measured at pH 8, 0.01 M NaCl)=n. 1030 µeq/g
  ii. High DS p-MFC (pH 8, 0.01 M NaCl)=n. 1460 µeq/g
Example of MFC made from non-derivatized cellulose are:
  iii. MFC from kraft pulp (No pH adjustment, 0.01 M NaCl)=−50 µeq/g Example—Surface Treatment of the Film a) Films Produced from MFC from Kraft Pulp.

The films were prepared from non-derivatized nanocellulose (native MFC made from kraft pulp, as mentioned in iii) above)
  #1 (reference). MFC film (20 gsm) with no dipping in citric acid.
  #2 Same film as in #1 but dipped in Citric Acid solution (pH<2). A clear improvement in WVTR properties is seen (=lower WVTR). The sheets were soaked in a 30 wt-% solution of citric acid for ca. 10 seconds, followed by couching in between blotting papers and drying in an oven at 60° C. overnight under a weight).
  #3 Same film as in #1 but dipped in buffered solution (Citric Acid+NaOH). Very low WVTR values are obtained. The buffered solution was prepared by adding NaOH to the citric acid solution until the pH of the solution was 4.0. Same drying principle as in #2
  #4 Same as in #2 but dried at higher temperature. These results are slightly better. The drying was performed at 80° C. instead of 60° C.
  #5 Same as in #3 but dried at higher temperature. Higher drying temperature is better. The drying was performed at 80° C. instead of 60° C.
  #6 Reference MFC film (higher grammage, 30 gsm) no treatment with CA
  #7 Same as #6 but treated with CA having low pH (2). Same treatment and drying procedure as in #2.
  #8 Same as #6 but treated with CA having higher pH (4)
  #9 Same as #6 but treated with CA having low pH (2) but dried at higher temperature. Same treatment procedure as in #4.
  #10 Same as #6 but treated with CA having higher pH (4) but dried at higher temperature In the experiments, the samples were treated with 30 wt % citric acid solution. The MFC used was a non-derivatized MFC grade. The treatment was made by immersing in a solution. The WVTR was measured according to ASTM F-1249.

TABLE 1

| | pH of the solution | Drying | WVTR, g/m2/24 h 23° C./50% RH | pH of film substrate after treatment and drying |
|---|---|---|---|---|
| #1 Ref-MFC | (no CA) | 40° C. | 116 | N.D. |
| #2 | <2 | 60° C. | 45 | N.D. |

TABLE 1-continued

| | pH of the solution | Drying | WVTR, g/m2/24 h 23° C./50% RH | pH of film substrate after treatment and drying |
|---|---|---|---|---|
| #3 | 4 | 60° C. | 6 | N.D. |
| #4 | <2 | 80° C. | 31 | N.D. |
| #5 | 4 | 80° C. | 5 | N.D. |
| #6 | (no CA dipping) | Pilot PM | 107 | 5.51 |
| #7 | <2 | 60° C. | 21 | 1.74 |
| #8 | 4 | 60° C. | 4 | 4.29 |
| #9 | <2 | 80° C. | 6 | 1.74 |
| #10 | 4 | 80° C. | 4 | 4.29 |

The surface pH should preferably be higher than 2 or more preferably higher than 3 or most preferably higher than 4; since low pH might be a safety risk, or cause corrosion on the machine. We also believe that it might influence the long term stability of the substrates.

Surface pH is measured by using fresh pure water which is placed on the surface. 5 parallel measurements are performed and average pH value is calculated. The sensor is flushed with pure or ultra-pure water and the paper sample is then placed on the moist/wet sensor surface and pH is recorded after 30 s.

As can be seen from the results in Table 1 the water vapor transmission rate of the films improves after surface treatment with citric acid. It can also be seen that by having a higher surface pH during the treatment and also by increasing the drying temperature the barrier properties of the film are even further improved.

b) Films Produced from Phosphorylated MFC.

The films were prepared from low phosphorylated MFC with low degree of substitution (Low DS p-MFC, according to i) above) and phosphorylated MFC with a high degree of substitution (High DS p-MFC, according to ii) above).
  #1 Low DS p-MFC film (20 gsm) dipped in Citric Acid solution. The film was thereafter dried in an oven in 80° C. overnight. The sample was thereafter cured in 150° C. for 5 minutes. The WVTR values were determined before and after thermal curing.
  #2 Same film as in #1 but dipped in Citric Acid solution where the pH of the solution was adjusted to 4 by addition of NaOH.
  #3 High DS p-MFC film (20 gsm) comprising 25% by weight of nanoparticles (Cloisite). The film was dipped in Citric Acid solution. The film was thereafter dried in an oven in 80° C. overnight. The sample was thereafter cured in 150° C. for 5 minutes. The WVTR values were determined before and after thermal curing.

In the experiments, the samples were treated with 30 wt % citric acid solution. The treatment was made by immersing the samples in the solution. The results are showed in Table 2. The WVTR was measured according to ASTM F-1249.

TABLE 2

| | | Film | |
|---|---|---|---|
| | Dipping Solution | WVTR, g/m2/24 h 23° C./50% RH before curing | WVTR, g/m2/24 h 23° C./50% RH after curing |
| Low DS pMFC | 30 wt-% CA | 106 | 60 |
| | 30 wt-% CA, pH 4 | 6.3 | 3.8 |
| High DS pMFC | 30 wt-% CA | 13 | 13 |

As can be seen from the results in Table 2 the water vapor transmission rates of the films are very good after surface treatment with citric acid. It can also be seen that by having a higher surface pH during the treatment further improves the WVTR. Also, the results in Table 2 also shows that drying at an increased temperature and even post-curing of the film will improve the WVTR value of the films. It is believed that by drying at increased temperature and post-curing of the film will improve the cross-linking.

Example—Oxidized Nanocellulose

The following example shows that a film made of a mixture of a MFC made from Kraft fiber and anionic oxidized nanocellulose (SuCellose, Innotech materials) with high crystallinity, provides increased WVTR when applying the method according to the invention.

Example 1b: Reference 20 gsm film, without additives. Treatment in citric acid solution (pH<2) gave WVTR (23° C., 50% RH) value of 37.

Example 2b: Corresponding sample and treatment to 1b, but with 5% of oxidized nanocellulose gave WVTR of 30

Example 3b: Corresponding sample and treatment to 1b, but with 10% of oxidized nanocellulose gave WVTR of 29

Example 4b: Corresponding sample and treatment to 1b, but with 25% of oxidized nanocellulose gave WVTR of 20

Example 5b: Corresponding sample and treatment to 1b, but with 50% of oxidized nanocellulose gave WVTR of 9.6

Example 6b: Reference 20 gsm film, without additives. Treatment in citric acid solution (pH 4) gave WVTR (23° C., 50% RH) value of 2.5.

Example 2b: Corresponding sample and treatment to 6b, but with 5% of oxidized nanocellulose gave WVTR of 1.2

Example 3b: Corresponding sample and treatment to 6b, but with 10% of oxidized nanocellulose gave WVTR of 4.7

Example 4b: Corresponding sample and treatment to 6b, but with 25% of oxidized nanocellulose gave WVTR of 4

Example 5b: Corresponding sample and treatment to 6b, but with 50% of oxidized nanocellulose gave WVTR of 2.9

The WVTR was measured according to ASTM F-1249.

TABLE 3

| Sample | WVTR, g/m$^2$/24 h 23° C./50% RH |
|---|---|
| Ref pH <2 | 37 |
| Oxidized nanocellulose 5% pH <2 | 30 |
| Oxidized nanocellulose 10% pH <2 | 29 |
| Oxidized nanocellulose 25% Ph <2 | 20 |
| Oxidized nanocellulose 50% pH <2 | 9.6 |
| Ref pH 4 | 2.5 |
| Oxidized nanocellulose 5% pH 4 | 1.2 |
| Oxidized nanocellulose 10% pH 4 | 4.7 |
| Oxidized nanocellulose 25% pH 4 | ~4 |
| Oxidized nanocellulose 50% pH 4 | 2.9 |

Example—Effect of Calendering

These examples show the effect of calendering

A 30 gsm film was dipped in 30% CA solution (pH 4), dried (80°/overnight) and subjected for calendering at the pilot PM with the conditions in calendering: 3.5 kP/cm2, 10 m/min, 100-140° C., 1-3× through the nip, soft nip on top. The results show that small improvements can be achieved although made as off-line process. In an on-line, or off-line with a pre-heater, it is expected that the results would be improved.

Table 4 shows the effect of calendaring (Pilot PM calender, soft nip on top, 1-3 x through the nip, 100-140° C.) on water vapor transmission rate of the films treated with citric acid with a citric acid solution (30 wt-%, pH 4) and dried in 80° C./overnight. The WVTR was measured according to ASTM F-1249.

TABLE 4

| Calendering | | WVTR, g/m$^2$ /24 h 23° C./50% RH |
|---|---|---|
| No dipping in CA, no calendering (ref) | | 102/112 |
| Dipped in CA, no calendering | | 4 |
| 100° C. | 1x | 3 |
| | 2x | 4 |
| | 3x | 3 |
| 120° C. | 1x | 6 |
| 140° C. | 1x | 5 |
| | 2x | 3 |
| | 3x | 3 |

As can been seen in Table 4 the WVTR of the films is still good and even improved after calendering. Consequently, it is possible to calender the films after surface treatment to improve for example the gloss of the films without deteriorate the barrier properties.

The invention claimed is:

1. A method for preparing a surface-treated fibrous material comprising nanocellulose, said method comprising the steps of:
   a. forming a fibrous material from a suspension comprising nanocellulose, and
   b. surface treatment of the fibrous material with a solution comprising an organic acid or organic acid salt, to obtain a surface-treated fibrous material having a surface pH of at least 3, wherein the surface-treated fibrous material has a Water Vapour Transmission Rate (WVTR) value in a range of 1-30 cc/m$^2$/24 h (23° C., 50% RH) according to ASTM F-1249 at a grammage between 10-50 gsm.

2. The method according to claim 1, which fibrous material is formed from a suspension comprising native nanocellulose.

3. The method according to claim 1, wherein the suspension comprises modified nanocellulose.

4. The method according to claim 1, wherein the surface-treated fibrous material has a surface pH above 4.

5. The method according to claim 1, wherein the organic acid is selected from a group consisting of: citric acid, lactic acid, acetic acid, formic acid, oxalic acid and uric acid.

6. The method according to claim 1, wherein the organic acid salt is a salt of an organic acid selected from a group consisting of: citric acid, lactic acid, acetic acid, formic acid, oxalic acid and uric acid.

7. The method according to claim 1, wherein the surface treatment step is followed by drying of the surface-treated fibrous material.

8. The method according to claim 1, further comprising a neutralizing treatment step of the fibrous web or the nanocellulose suspension with a neutralizing agent before any drying step.

9. The method according to claim 1, wherein the fibrous material is dried to obtain a solid content of more than 1% by weight.

10. The method according to claim 1, further comprising a dewater step, wherein the fibrous material has been partly crosslinked by treatment with at least one crosslinking agent before or during the dewatering step.

11. The method according to claim 1, wherein the fibrous material has a Water Vapor Transmission Rate (WVTR) value before surface treatment higher than 50 g/m$^2$/24 h (23° C., 50% RH) according to ASTM F-1249.

12. The method according to claim 1, wherein the forming comprises casting, wet-laying, or coating on a substrate from which the fibrous material is not removed.

13. The method according to claim 1, wherein the fibrous material is a film or a coating.

14. The method according to claim 1, wherein the fibrous material to be surface-treated is a free standing film.

15. The method according to claim 1, wherein the fibrous material is post-cured in roll or sheet form, at an average temperature of at least 40° C., for at least 1 hour.

16. The method according to claim 1, wherein the fibrous material comprises at least 0.1 wt % starch.

17. The method according to claim 1, wherein the solution comprises at least additives selected from a group consisting of: nanoclay, lignin, starch, MFC, and cellulose derivatives.

18. The method according to claim 1, wherein the fibrous material contains at least 0.5 wt % oxidized nanocellulose.

19. The method according to claim 18, wherein the oxidized nanocellulose has a crystallinity higher than 50%.

* * * * *